US012687405B2

(12) United States Patent
Zeng et al.

(10) Patent No.: US 12,687,405 B2
(45) Date of Patent: Jul. 21, 2026

(54) SYSTEM FOR FUSING TWO OR MORE VERSIONS OF MAP DATA BASED ON SPATIAL KALMAN FILTERING

(71) Applicant: GM Global Technology Operations LLC, Detroit, MI (US)

(72) Inventors: Shuqing Zeng, Sterling Heights, MI (US); Fan Bai, Ann Arbor, MI (US); Bo Yu, Troy, MI (US); Gui Chen, Sterling Heights, MI (US); Cem U. Saraydar, Birmingham, MI (US); Mason David Gemar, Cedar Park, TX (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 414 days.

(21) Appl. No.: 18/473,607

(22) Filed: Sep. 25, 2023

(65) Prior Publication Data

US 2025/0102320 A1     Mar. 27, 2025

(51) Int. Cl.
*G01C 21/00*          (2006.01)
*G01C 21/32*          (2006.01)
(52) U.S. Cl.
CPC ........... *G01C 21/387* (2020.08); *G01C 21/32* (2013.01); *G01C 21/3815* (2020.08); *G01C 21/3841* (2020.08)
(58) Field of Classification Search
CPC .. G01C 21/387; G01C 21/32; G01C 21/3815; G01C 21/3841; G01C 21/3867; G06F 16/29
See application file for complete search history.

(56) References Cited

U.S. PATENT DOCUMENTS

| 2023/0060542 A1 | 3/2023 | Friedrich et al. |
| 2023/0091252 A1* | 3/2023 | Wang ...................... G06F 16/29 |
| | | 701/450 |

FOREIGN PATENT DOCUMENTS

WO        2019207160 A1    10/2019

OTHER PUBLICATIONS

Trogh, Jens, et al. "Map matching and lane detection based on Markovian behavior, GIS, and IMU data." IEEE Transactions on Intelligent Transportation Systems 23.3 (2020): 2056-2070. (Year: 2020).*

(Continued)

*Primary Examiner* — Alan D Hutchinson
(74) *Attorney, Agent, or Firm* — Vivacqua Crane, PLLC

(57)          ABSTRACT
A system for fusing two or more versions of map data together includes one or more central computers that receive road network data representing a road network for a predefined geofenced area. The central computers receive road network data that includes a discrete random curve that represents lane markings. The discrete random curve includes a plurality of state vectors that are each defined by a respective location and tangent angle. The central computers estimate the position for the state vectors of the discrete random curve based on a signed distance and the tangent angle by minimizing a spatial Kalman filter cost function and execute a Kalman smoothening function to estimate the position and the tangent angle for the state vectors that are part of the discrete random curve, where the state vectors each represent a map point of the fused map data.

17 Claims, 5 Drawing Sheets

(56)      References Cited

OTHER PUBLICATIONS

Difference between Hidden Markov models and Particle Filter (and Kalman Filter), internet discussion from Stack Exchange (2016) (Year: 2016).*

* cited by examiner

SYSTEM FOR FUSING TWO OR MORE VERSIONS OF MAP DATA BASED ON SPATIAL KALMAN FILTERING

INTRODUCTION

The present disclosure relates to a system for fusing two or more versions of map data together to create fused map data based on spatial Kalman filtering.

An autonomous vehicle executes various tasks such as, but not limited to, perception, localization, mapping, path planning, decision making, and motion control. Autonomous vehicles rely upon map data for many of the tasks that are executed such as localization, mapping, and path planning. It is to be appreciated that different versions of map data representing the same geographical area may be generated, where each version of the map data is generated from different data sources.

One example of a version of map data is crowdsourced map data. Crowdsourced map data is generated based on global positioning system (GPS) data and data collected by vehicles on the road. Some examples of the data collected by the vehicles include image data collected by an on-board camera, vehicle speed, and yaw sensor data. While crowdsourced maps provide real-time information for constructing lane markings as well as clear lane line attributes, crowdsourced maps may face challenges because of calibration issues with the on-board camera. Also, the GPS data may introduce bias and random noise to the crowdsourced map.

Map data based on telemetry data, such as a high-speed vehicle telemetry (HSVT) source, may provide a high confidence level and is usually relatively easy to procure. However, telemetry-based map data does not provide lane line attributes such as color and type. Also, telemetry-based map data is determined based on the behavior of individual drivers who operate the vehicles. Aerial map data, which is based on satellite image data, may provide a high degree of precision. However, aerial map data may not consistently provide lane line attributes. Moreover, aerial maps are time-consuming to create, may be outdated depending on when images were collected, and may contain regions that are occluded due to issues such as tree cover. Finally, high-definition map data is generated based on data collected from survey vehicles and may provide a high degree of precision as well as lane line attributes. However, high-definition map data is time-consuming to update.

In one approach to alleviate the above-mentioned challenges, the map data may be combined based on a cascaded layered architecture. In this approach, if a particular version of the map data does not provide the level of accuracy required for a specific application, then the cascaded layered architecture provides another version of the map data in its place. However, the cascaded layered architecture merely uses each version of the map data as an alternative option and does not integrate different versions of the map data together. Thus, while maps for autonomous vehicles achieve their intended purpose, there is a need in the art for an improved approach for procuring map data that alleviates the above-mentioned challenges.

SUMMARY

According to several aspects, a system for fusing two or more versions of map data together to create fused map data is disclosed. The system includes one or more central computers storing the two or more versions of map data and ground truth map data. Each version of the map data represents a predefined geofenced area. The one or more central computers execute instructions to receive road network data representing a road network for the predefined geofenced area, a first set of map data points, and a second set of map data points, wherein the road network data includes a discrete random curve that represents lane markings, and where the discrete random curve includes a plurality of state vectors that are each defined by a respective location and tangent angle. The central computers determine a signed distance, where the signed distance includes a first perpendicular distance measured from a respective first map data point to the discrete random curve and a second perpendicular distance measured from a respective second map data point to the discrete random curve. The one or more central computers estimate a position for the state vectors of the discrete random curve based on the signed distance and the tangent angle by minimizing a spatial Kalman filter cost function. The central computers execute a Kalman smoothening function to estimate the position and the tangent angle for the state vectors that are part of the discrete random curve, where the state vectors each represent a map point of the fused map data.

In another aspect, the discrete random curve is one of the following: a polyline and a Markovian random curve.

In yet another aspect, the one or more central computers execute instructions to detect a data point representing a new state vector that is introduced to the discrete random curve, and in response to detecting the data point, estimate an updated state vector, where the updated state vector indicates respective values for the position and a tangent angle of a new data point.

In an aspect, the updated state vector is expressed as:

$$\hat{s}_k = \operatorname{argmin}_{s_k} (d_k - \mu_v)^T \sum v^{-1} (d_k - \mu_v) + \left(s_k - \widetilde{s_k}\right)^T \widetilde{P_k^{-1}} \left(s_k - \widetilde{s_k}\right),$$

where $\hat{s}_k$ represents the updated state vector, k represents a total number of state vectors, $\widetilde{s_k}$ represents a predicted state, $d_k$ represents a matrix indicating a lateral distance and a longitudinal distance for the first map data point and a lateral distance and a longitudinal distance for the second map data point, $\mu_v$ represents a bias of measurement noise, $$\sum_v^{-1}$$

represents a covariance of the measurement noise, and $\widetilde{P_k^{-1}}$ represents a covariance matrix.

In another aspect, the spatial Kalman filter cost function is expressed as:

$$\hat{l}_{1:k} = \min_{l_{1:k}} \sum_{i=1}^{k} (d_i - \mu_v)^T \sum_v^{-1} (d_i - \mu_v) + \frac{|\phi_i - \phi_{i-1}|^2}{q_u^2}$$

where $\hat{l}_{1:k}$ represents an estimated position of the updated state vector $s_k$, k represents a total number of state vectors, $d_i$ represents the signed distance for the first map data point and the second map data point, $\mu_v$ represents a bias of measurement noise, $q_u$ represents a variance of additive white Gaussian noise, $$\sum_{v}^{-1}$$

represents a covariance of the measurement noise, and $\phi_i$ represents the tangent angle.

In yet another aspect, the one or more central computers execute instructions to receive ground truth map data, execute one or more machine learning algorithms to determine a first bias and a first variance of the first set of map data points and a second bias and a second variance of the second set of map data points, and execute an iterative algorithm to remove outliers from the the the first map data point, the second map data point, and the ground truth map data.

In an aspect, the covariance of the measurement noise is determined based on the ground truth map data.

In another aspect, the iterative algorithm is a random sample consensus (RANSAC) voting algorithm.

In yet another aspect, the bias of the measurement noise is determined based on the first bias of the first set of map data points and the second bias of the second set of map data points.

In an aspect, the Kalman smoothing function is expressed as:

$$\hat{l}_{1:N} = \min_{\hat{l}_{1:N}} \sum_{i=1}^{N} (d_i - \mu_v)^T \sum_{v}^{-1} (d_i - \mu_v) + \frac{|\phi_i - \phi_{i-1}|^2}{q_u^2}$$

where $\hat{l}_{1:N}$ represents an estimated position of the updated state vector $s_k$, N denotes a total number of state vectors plus one, $d_i$ represents the signed distance for the first map data point and the second map data point, $\mu_v$ represents a bias of measurement noise, $q_u$ represents a variance of additive white Gaussian noise, $$\sum_{v}^{-1}$$

represents a covariance of the measurement noise, and $\phi_i$ represents the tangent angle.

In another aspect, the two or more versions of map data are each based on one or more of the following: global positioning system (GPS) data, perception data, a high-speed vehicle telemetry (HSVT) source, satellite image data, and data collected from survey vehicles.

In yet another aspect, a method for fusing two or more versions of map data together is disclosed. The method includes receiving, by one or more central computers, road network data representing a road network for a predefined geofenced area, a first set of map data points, and a second set of map data points, wherein the road network data includes a discrete random curve that represents lane markings, and where the discrete random curve includes a plurality of state vectors that are each defined by a respective location and tangent angle. The method includes determining, by the one or more central computers, a signed distance, where the signed distance includes a first perpendicular distance measured from a respective first map data point to the discrete random curve and a second perpendicular distance measured from a respective second map data point to the discrete random curve. The method includes estimating, by the one or more central computers, a position for the state vectors of the discrete random curve based on the signed distance and the tangent angle by minimizing a spatial Kalman filter cost function. The method further includes executing a Kalman smoothening function to estimate the position and the tangent angle for the state vectors that are part of the discrete random curve, where the state vectors each represent a map point of a fused map data.

In yet another aspect, the method further comprises detecting, by the one or more central computer, a data point representing a new state vector that is introduced to the discrete random curve, and in response to detecting the data point, estimating an updated state vector, where the updated state vector indicates respective values for a position and the tangent angle of a new data point.

In an aspect, a system for fusing two or more versions of map data together to create fused map data is disclosed. The system comprises one or more central computers storing the two or more versions of map data and ground truth map data, where each version of the map data represents a predefined geofenced area. The one or more central computers execute instructions to receive road network data representing a road network for the predefined geofenced area, a first set of map data points, and a second set of map data points, wherein the road network data includes a discrete random curve that represents lane markings, and where the discrete random curve includes a plurality of state vectors that are each defined by a respective location and tangent angle. The central computers determine a signed distance, wherein the signed distance includes a first perpendicular distance measured from a respective first map data point to the discrete random curve and a second perpendicular distance measured from a respective second map data point to the discrete random curve. The one or more central computers estimate a position for the state vectors of the discrete random curve based on the signed distance and the tangent angle by minimizing a spatial Kalman filter cost function, where the spatial Kalman filter cost function is expressed as:

$$\hat{l}_{1:k} = \min_{\hat{l}_{1:k}} \sum_{i=1}^{k} (d_i - \mu_v)^T \sum_{v}^{-1} (d_i - \mu_v) + \frac{|\phi_i - \phi_{i-1}|^2}{q_u^2}$$

where $\hat{l}_{1:k}$ represents an estimated position of an updated state vector $s_k$, k represents a total number of state vectors, $d_i$ represents the signed distance for the first map data point and the second map data point, $\mu_v$ represents a bias of measurement noise, $q_u$ represents a variance of additive white Gaussian noise, $$\sum_{v}^{-1}$$

represents a covariance of the measurement noise, and $\phi_i$ represents the tangent angle. The one or more central computers execute a Kalman smoothening function to estimate the position and the tangent angle for the state vectors that are part of the discrete random curve, where the state vectors each represent a map point of the fused map data.

In another aspect, the one or more central computers execute instructions to receive ground truth map data, execute one or more machine learning algorithms to determine a first bias and a first variance of the first set of map data points and a second bias and a second variance of the second set of map data points, and execute an iterative algorithm to remove outliers from the ground truth map data.

In yet another aspect, the covariance of the measurement noise is determined based on the ground truth map data.

In an aspect, the iterative algorithm is a random sample consensus (RANSAC) voting algorithm.

In another aspect, the one or more central computers execute instructions to detect a data point representing a new state vector that is introduced to the discrete random curve and in response to detecting the data point, estimate an updated state vector, where the updated state vector indicates respective values for a position and the tangent angle of a new data point.

In yet another aspect, the updated state vector is expressed as:

$$\hat{s}_k = \mathrm{argmin}_{s_k} (d_k - \mu_v)^T \sum v^{-1} (d_k - \mu_v) + \left(s_k - \tilde{s_k}\right)^T \widetilde{P_k^{-1}} (s_k - \tilde{s_k})$$

where $\hat{s}_k$ represents the updated state vector, $\tilde{s_k}$ represents a predicted state, $d_k$ represents a matrix indicating a lateral distance and a longitudinal distance for the first map data point and a lateral distance and a longitudinal distance for the second map data point, and $\widetilde{P_k^{-1}}$ represents a covariance matrix.

In an aspect, the Kalman smoothing function is expressed as:

$$\hat{l}_{1:N} = \min_{\hat{l}_{1:N}} \sum_{i=1}^{N} (d_i - \mu_v)^T \sum_v^{-1} (d_i - \mu_v) + \frac{|\phi_i - \phi_{i-1}|^2}{q_u^2}$$

where $\hat{l}_{1:N}$ represents an estimated position of the updated state vector $s_k$ and N denotes the total number of state vectors plus one.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
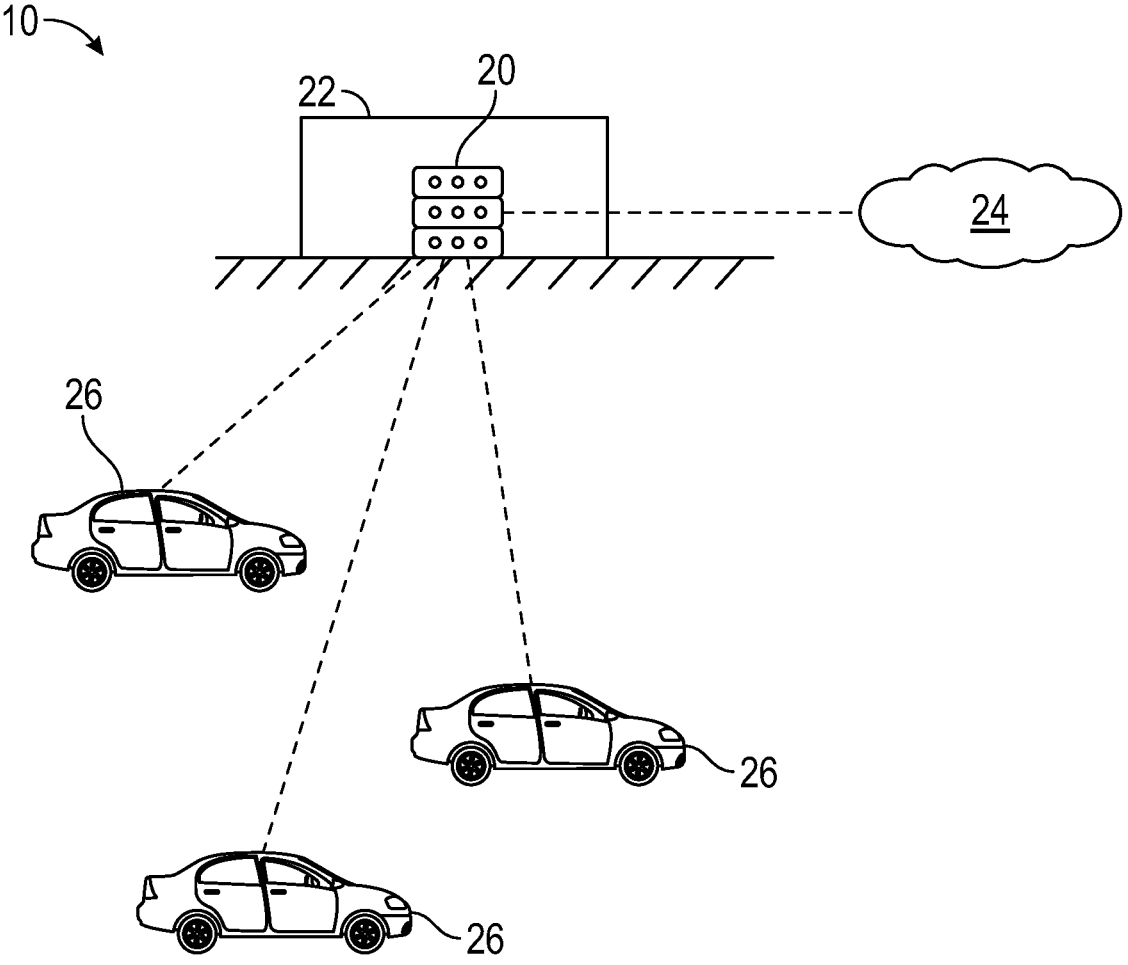
FIG. 1 is a schematic diagram of the disclosed system for fusing together two or more versions of map data, where the system includes one or more central computers that receive map data from different sources across a network, according to an exemplary embodiment.

Referring to FIG. 1, an exemplary system 10 for fusing together two or more versions of map data is illustrated. The system 10 includes one or more central computers 20 located at a back-end office 22, where the one or more central computers 20 are in wireless communication with one or more communication networks 24. The one or more central computers 20 obtain the two or more versions of map data and ground truth map data via the one or more communication networks 24. In embodiments, the one or more central computers 20 store the two or more versions of map data and ground truth map data locally in memory. Each version of the map data represents the same predefined geofenced area, where the predefined geofenced area represents a real-world geographical area that is defined by a virtual perimeter.

It is to be appreciated that each version of the map data is based on a unique source of data such as, for example, global positioning system (GPS) data, perception data, a high-speed vehicle telemetry (HSVT) source, satellite image data, or data collected from survey vehicles. It is to be appreciated that the perception data includes imagery as well as semantic data that is collected by perception sensors that are part of one or more vehicles. Although perception sensors are described, in addition to or in the alternative, the perception data be collected by infrastructure perception sensors such as, for example, roadside cameras. Some examples of versions of map data include, but are not limited to, crowd-sourced map data, telemetry-based map data, and aerial map data. It is also to be appreciated that high-definition map data represents the ground truth map data that is collected from survey vehicles and validated.

Figure 2:
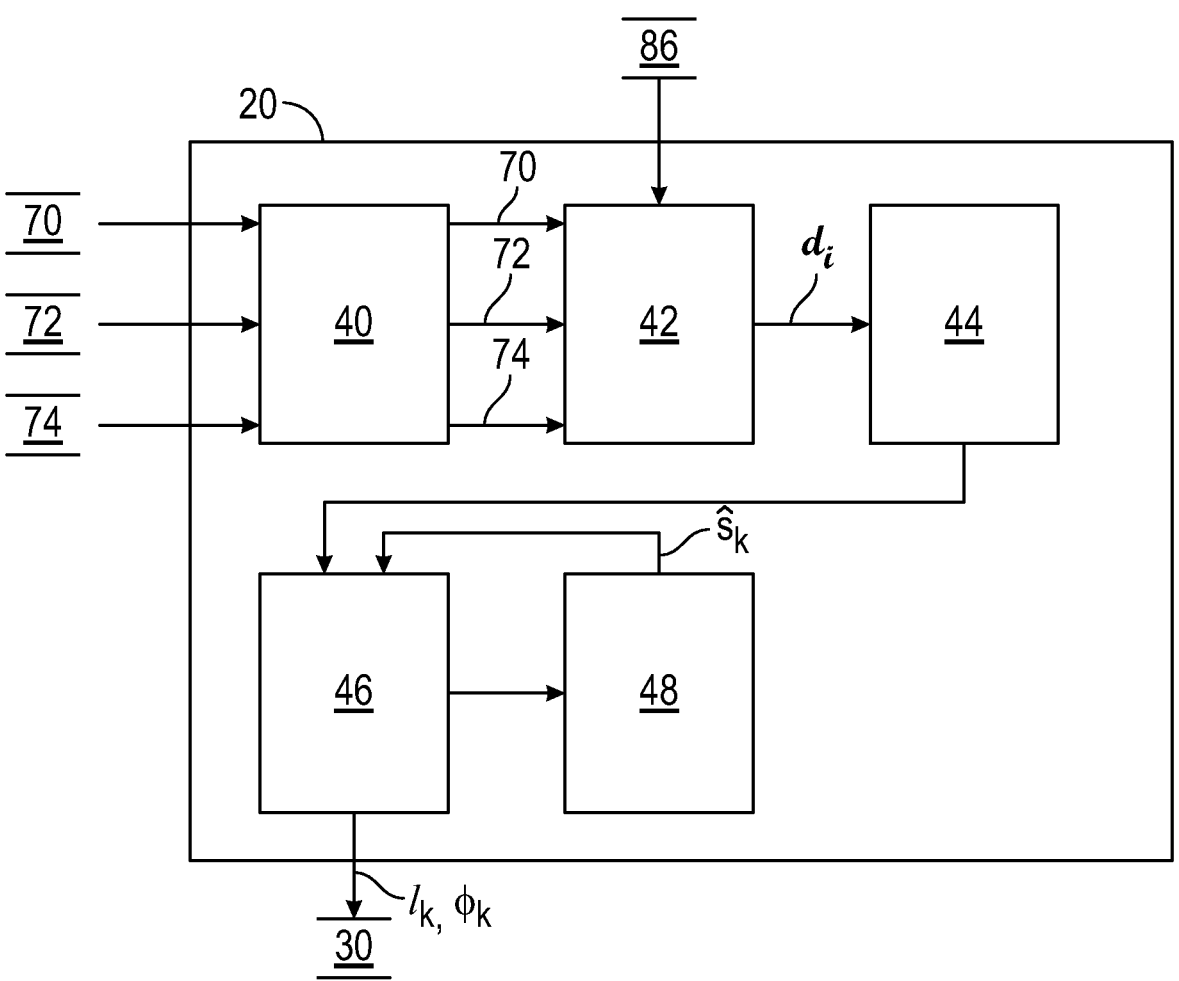
FIG. 2 is a block diagram illustrating the software architecture for the one or more central computers shown in FIG. 1, according to an exemplary embodiment.

In one non-limiting embodiment, the map data is created specifically for an autonomous driving system such as, for example, an automated driving system (ADS) or an advanced driver assistance system (ADAS). In another embodiment, the map data is created for inventory of roadway features, control devices, and the like. In an embodiment, other dynamic map layers may be introduced on top of the map data, such as map layers indicating roadway surface or traffic conditions. As explained below, the system 10 fuses together the two or more versions of map data to create fused map data 30 (FIG. 2). Since the fused map data 30 is based on more than one unique source of data, the fused map data 30 includes a greater precision and accuracy when compared to the original versions of map data alone. In the non-limiting embodiment as shown in FIG. 1, the one or more central computers 20 are in wireless communication with one or more autonomous vehicles 26. After determining the fused map data 30, the one or more central computers 20 may share the fused map data 30 with the one or more autonomous vehicles 26.

Figure 3:
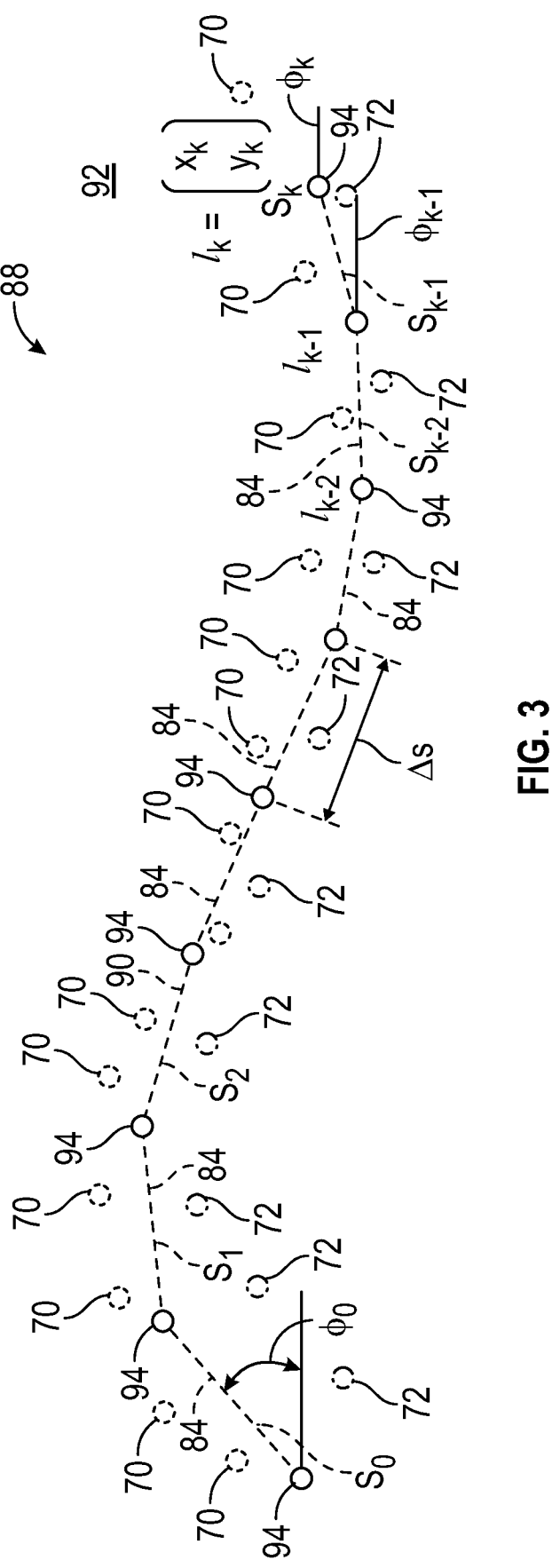
FIG. 3 is an exemplary illustration of a portion of a road network including a discrete random curve that represents lane markings, according to an exemplary embodiment.

FIG. 2 is a block diagram illustrating the software architecture of the one or more central computers 20 shown in FIG. 1. In the example as shown in FIG. 2, the one or more central computers 20 includes an error model 40, a measurement module 42, a cost function module 44, a smoothing module 46, and a state vector module 48. The error model 40 of the one or more central computers 20 receives two or more versions of map data points 70, 72 and ground truth map data 74 as input. Specifically, in the example as shown in FIG. 2, the error model 40 receives a first set of map data points 70 that correspond to a first version of the map data and a second set of map data points 72 that correspond to a second version of the map data. In an embodiment, the map data points 70, 72 represent lane markings that are disposed along a roadway 92 (FIG. 3). It is to be appreciated that both sets of map data points 70, 72 are associated with one another, and therefore represent the same map attributes, such as a lane line.

In one embodiment, the error model 40 may also receive ground truth map data 74 as input, however, it is to be appreciated that the ground truth map data may not be available. It is also to be appreciated that high-definition map data represents the ground truth map data. The first set of map data points 70 includes a first confidence value corresponding to the first version of the map data, and the second set of map data points 72 includes a second confidence value corresponding to the second version of the map data. The error model 40 of the one or more central computers 20 executes one or more machine learning algorithms to determine a first bias and a first variance of the first set of map data points 70 and a second bias and a second variance of the second set of map data points 72. In the event ground truth map data 74 is included, the error model 40 executes an iterative algorithm such as, for example, a random sample consensus (RANSAC) voting algorithm to remove outliers from the first version of the map data, the second set of map data points 72, and the ground truth map data 74. In embodiments, the ground truth map data 74 is based on an unbiased sampling of a road dataset.

The measurement module 42 receives the first set of map data points 70, the first bias and the first variance, the second set of map data points 72, the second bias and the second variance, the ground truth map data 74 (if applicable), and road network data 86 representing a road network 88 (FIG. 3) for the predefined geofenced area as input from the one or more communication networks 24 (FIG. 1). One example of road network data 86 is the open street map (OSM); however, it is to be appreciated that other types of road network data may be used as well.

FIG. 3 is an exemplary illustration of a portion of the road network 88. Referring to both FIGS. 2 and 3, the road network 88 includes a discrete random curve 90 that represents the lane lines disposed along the roadway 92. The discrete random curve 90 is defined by a series of discrete arc segments 84 that are connected by a plurality of nodes 94 and includes a plurality of state vectors $s_k$ where k represents a total number of state vectors $s_k$, and k=1, . . . , N and N denotes the total number of state vectors $s_k$ plus one. The discrete random curve 90 is a polyline or a Markovian random curve, where only state vectors $s_k$ positioned consecutively with respect to one another are correlated to one another. The series of state vectors $s_k$ define a step $\Delta s$, where the step $\Delta s$ represents a distance between two consecutive state vectors $s_k$ that are positioned directly adjacent to one another along the discrete random curve 90 and represents a spatial equivalent of the standard time series $\Delta t$ of Kalman filtering.

Continuing to refer to FIG. 3, each node 94 is positioned between two consecutive state vectors $s_k$. The state vectors $s_k$ are two-dimensional vectors that are defined by state variables $l_k$, $\phi_k$, where $l_k$ represents a position of a respective state vector $s_k$, which is expressed in Cartesian coordinates $(x_k, y_k)$ and $\phi_k$ represents a tangent angle of a respective state vector $s_k$. As explained below, the system 10 estimates the position $l_i$ and the tangent angle $\phi_i$ for each state vector $s_k$, where the position $l_i$ and the tangent angle $\phi_i$ for each state vector $s_k$ represents a map data point of the fused map data 30 (FIG. 2). As seen in FIG. 3, the first set of map data points

70 and the second set of map data points 72 are also superimposed on the road network 88.

Figure 4:
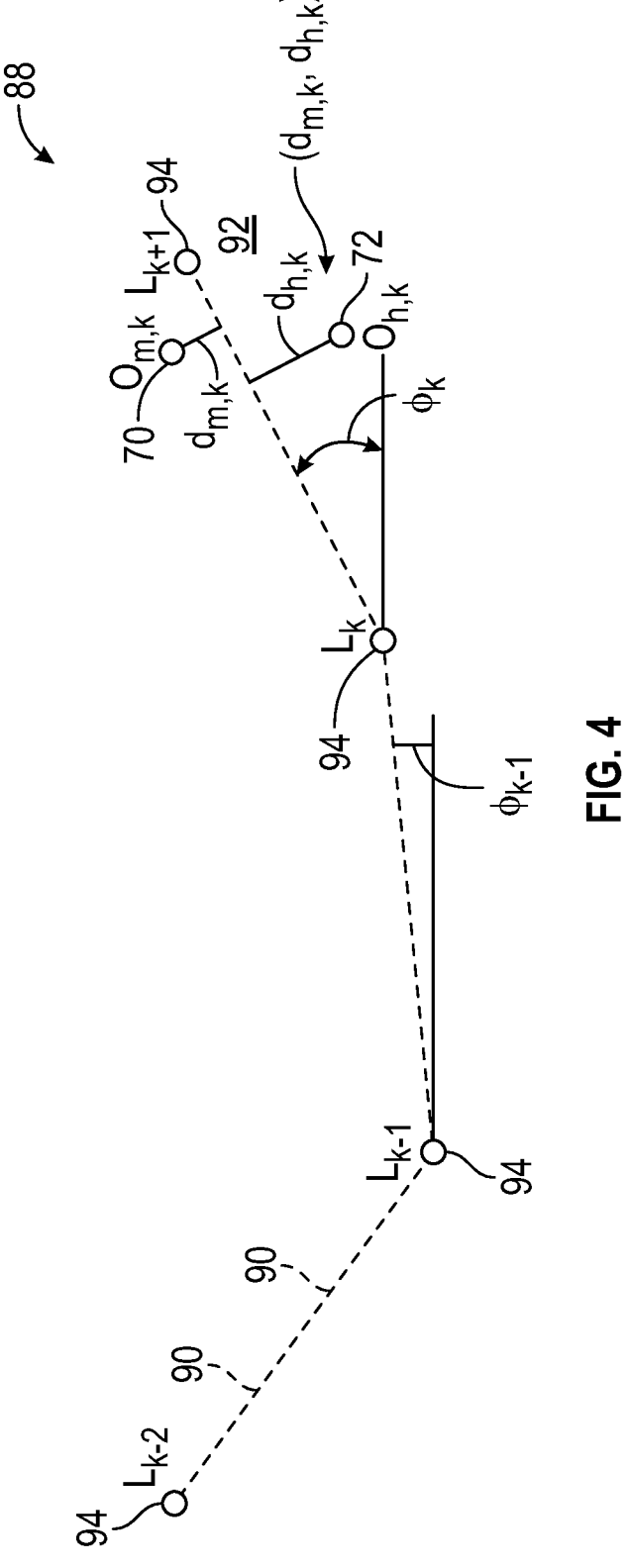
FIG. 4 illustrates a portion of the discrete random curve shown in FIG. 3, according to an exemplary embodiment.

The first set of map data points 70 are part of a first line curve M(s), where each of the first set of map data points 70 are expressed as first series points $o_{m,k}=M(s_k)$ for k=1, . . . , N and the second set of map data points 72 are part of a second line curve H(s), where each of the second set of map data points 72 are expressed as second series points $o_{h,k}=H(s_k)$ for k=0, . . . , N. FIG. 4 is an enlarged view of a portion of the discrete random curve 90 shown in FIG. 3 starting at the state vector $s_{k-2}$ and terminating at state vector $s_{k+1}$. Referring to FIGS. 2, 3 and 4, a random variable $L_k$ (FIG. 4) corresponds to each node 94 of the discrete random curve 90 and denotes a realization value of the position $l_k$(FIG. 2) of each state vector $s_k$. The measurement module 42 determines a signed distance $d_i$ between a respective first map data point $o_{m,i}$ and a respective second map data point $o_{h,i}$, where the signed distance $d_i$ includes a first perpendicular distance $d_{m,k}$ measured from the respective first map data point $o_{m,k}$ to the discrete random curve 90 and a second perpendicular distance $d_{h,k}$ measured from the respective second map data point $o_{h,k}$, or $d_i=(d_{m,k}, d_{h,k})$ to the discrete random curve 90.

Referring to FIG. 2, the cost function module 44 of the one or more central computers 20 receives the signed distance $d_i$ from the measurement module 42 and estimates the position $l_k$ (FIG. 2) for the k number of state vectors $s_k$ that are part of the discrete random curve 90 based on the signed distance $d_i$ and the tangent angle $\phi_k$ by minimizing a spatial Kalman filter cost function. It is to be appreciated that the spatial Kalman cost function represents an objective solution that results in determining the best fit solution for estimating the position $l_k$. It is to be appreciated that because the step $\Delta s$ of the discrete random curve 90 (FIG. 2) represents a spatial equivalent of the standard time series $\Delta t$, a spatial Kalman filtering technique is employed to fuse the two or more versions of the map data together to create the fused map data 30. The spatial Kalman filter cost function is expressed in Equation 1 as:

$$\text{Equation 1}$$

$$\hat{l}_{1:k} = \min_{\hat{l}_{1:k}} \sum_{i=1}^{k} (d_i - \mu_v)^T \sum_v^{-1} (d_i - \mu_v) + \frac{|\phi_i - \phi_{i-1}|^2}{q_u^2}$$

where $\hat{l}_{1:k}$ represents an estimated position of the respective state vector $s_k$, $\mu_v$ represents the bias of measurement noise, $\phi_i$ represents a tangent angle of a respective state vector $s_k$, $q_u$ represents the variance of additive white Gaussian noise, and $$\sum_v^{-1}$$

represents the covariance of the measurement noise. It is to be appreciated that the bias of the measurement noise $\mu_v$ is determined based on the first bias of the first set of map data points 70 and the second bias of the second set of map data points 72. It is also to be appreciated that if the ground truth map data 74 is provided, then the covariance of the measurement noise $$\sum_v^{-1}$$

is determined based on the ground truth map data 74. Otherwise, the covariance of the measurement noise $$\sum_v^{-1}$$

is determined based on crowdsourced map data, which is received from multiple vehicles and/or vehicle passes.

It is to be appreciated that the spatial Kalman filter cost function filters the state vectors $s_k$ by forward recursion through the discrete random curve 90 (FIG. 3). The smoothing module 46 receives the state vectors $s_k$ from the cost function module 44 of the one or more central computers 20. The smoothing module 46 then executes a Kalman smoothing function upon the state vectors $s_k$ by backward recursion through the discrete random curve 90, where the backward recursion includes the most recent state vectors $s_k$. The Kalman smoothing function is expressed in Equation 2 as:

$$\hat{l}_{1:N} = \min_{\hat{l}_{1:N}} \sum_{i=1}^{N} (d_i - \mu_v)^T \sum_v^{-1} (d_i - \mu_v) + \frac{|\phi_i - \phi_{i-1}|^2}{q_u^2}$$

<div align="right">Equation 2</div> where $\hat{l}_{1:N}$ represents an estimated position of the respective state vector $s_k$, the Kalman smoothening function estimates the position $l_k$ and the tangent angle $\phi_k$ (FIG. 2) for the N number of state vectors $s_k$ that are part of the discrete random curve 90, where the state vectors $s_k$ each represent a map point of the fused map data 30.

It is to be appreciated that the cost of performing the Kalman smoothening function as described in Equation 2 increases cubically with the size of the k number of state vectors $s_k$, and it is required to execute the Kalman smoothing function each time the state vector module 48 of the one or more central computers 20 detects a data point representing a new state vector $s_k$ that is introduced to the discrete random curve 90 (FIG. 3). Therefore, the state vector module 48 estimates an updated state vector $\hat{s}_k$ in response to introducing a new state vector $s_k$ to the discrete random curve 90, where the updated state vector $\hat{s}_k$ indicates respective values for the position $l_k$ and the tangent angle $\phi_k$ of the new data point. The updated state vector $\hat{s}_k$ is expressed in Equation 3 as:

$$\hat{s}_k = \operatorname{argmin}_{s_k} (d_k - \mu_v)^T \sum v^{-1} (d_k - \mu_v) + (s_k - \widetilde{s_k})^T \widetilde{P_k^{-1}} (s_k - \widetilde{s_k})$$

<div align="right">Equation 3</div> where $\widetilde{s_k}$ represents a predicted state, $d_k$ represents a matrix indicating a lateral distance and a longitudinal distance for the first map data point and a lateral distance and a longitudinal distance for the second map data point, and $\widetilde{P_k^{-1}}$ represents a covariance matrix.

Figure 5:
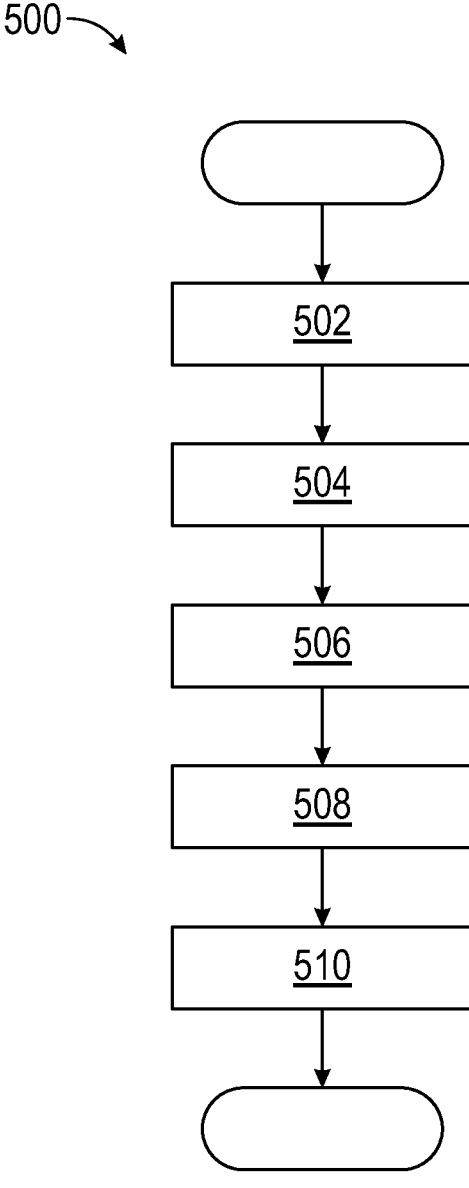
FIG. 5 illustrates a process flow diagram illustrating a method for fusing together two or more versions of map data by the system shown in FIG. 1, according to an exemplary embodiment.

FIG. 5 is a process flow diagram illustrating a method 500 for fusing two or more versions of map data together. Referring generally to FIGS. 1-5, the method 500 may begin at block 502. In block 502, the error model 40 of the one or more central computers 20 executes one or more machine learning algorithms to determine the first bias and the first variance of the first set of map data points 70 and the second bias and the second variance of the second set of map data points 72. In the event ground truth map data 74 is included, the error model 40 executes an iterative algorithm such as, for example, the RANSAC voting algorithm to remove outliers from the first version of the map data, the second set of map data points 72, and the ground truth map data 74. The method 500 may then proceed to block 504.

In block 504, the measurement module 42 receives the first set of map data points 70, the first bias and the first variance, the second set of map data points 72, the second bias and the second variance, the ground truth map data 74 (if applicable), and the road network data 86 representing the road network 88 (FIG. 3) for the predefined geofenced area as input from the one or more communication networks 24 (FIG. 1). As mentioned above, the road network 88 includes a discrete random curve 90 that represents the lane lines disposed along the roadway 92. The method 500 may then proceed to block 506.

In block 506, the measurement module 42 of the one or more central computers 20 determine the signed distance $d_i$, where the signed distance $d_i$ includes the first perpendicular distance $d_{m,K}$ measured from the respective first map data point $o_{m,k}$ to the discrete random curve 90 and the second perpendicular distance $d_{h,k}$ measured from the respective second map data point $o_{h,k}$, or $d_i=(d_{m,k}, d_{h,k})$ to the discrete random curve 90 (seen in FIG. 3). The method 500 may then proceed to block 508.

In block 508, the cost function module 44 of the one or more central computers 20 estimates the position $l_k$ for the k number of state vectors $s_k$ that are part of the discrete random curve 90 based on the signed distance $d_i$ and the tangent angle $\phi_k$ by minimizing a spatial Kalman filter cost function. The method 500 may then proceed to block 510.

In block 510, the smoothing module 46 of the one or more central computers 20 then executes a Kalman smoothening function to estimate the position $l_k$ and the tangent angle $\phi_k$ (FIG. 2) for the N number of state vectors $s_k$ that are part of the discrete random curve 90, where the state vectors $s_k$ each represent a map point of the fused map data 30. The method 500 may then terminate.

Referring generally to the figures, the disclosed system for fusing together two different versions of map data provides various technical effects and benefits. Specifically, the fused map data provides greater completeness, precision, and accuracy when compared to the original versions of the map data, and also includes enhanced robustness. It is to be appreciated that the discrete random curve that is employed to model the lane markings or edge features along a road may accommodate any type of unique road geometry, such as a clothoid. It is also to be appreciated that the current approach to fuse together map data is scalable, and therefore may extend to multiple lanes as well as to large-scale cloud-based maps.

The central computers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for fusing two or more versions of map data together to create fused map data, the system comprising:

one or more central computers storing the two or more versions of map data and ground truth map data where each version of the map data represents a predefined geofenced area, wherein the one or more central computers execute instructions to:

receive road network data representing a road network for the predefined geofenced area, a first set of map data points, and a second set of map data points, wherein the road network data includes a discrete random curve that represents lane markings, and wherein the discrete random curve includes a plurality of state vectors that are each defined by a respective location and tangent angle;

determine a signed distance, wherein the signed distance includes a first perpendicular distance measured from a respective first map data point to the discrete random curve and a second perpendicular distance measured from a respective second map data point to the discrete random curve;

estimate a position for the state vectors of the discrete random curve based on the signed distance and the tangent angle by minimizing a spatial Kalman filter cost function;

execute a Kalman smoothening function to estimate the position and the tangent angle for the state vectors that are part of the discrete random curve, wherein the state vectors each represent a map point of the fused map data;

detect a data point representing a new state vector that is introduced to the discrete random curve;

in response to detecting the data point, estimate an updated state vector, where the updated state vector indicates respective values for the position and a tangent angle of a new data point, wherein the updated state vector is expressed as:

$$\hat{s}_k = \mathrm{argmin}_{s_k}(d_k - [\![\mu_v]\!])^T \sum\nolimits_v^{-1}(d_k - \mu_v) + s_k - \widetilde{s_k})^T \widetilde{P_k^{-1}} s_k - \widetilde{s_k})$$

wherein $\hat{s}_k$ represents the updated state vector, k represents a total number of state vectors, $\widetilde{s_k}$ represents a predicted state, $d_k$ represents a matrix indicating a lateral distance and a longitudinal distance for the first map data point and a lateral distance and a longitudinal distance for the second map data point, $\mu_v$ represents a bias of measurement noise, $$\sum\nolimits_v^{-1}$$

represents a covariance of the measurement noise, and $\widetilde{P_k^{-1}}$ represents a covariance matrix; and fuse together the two or more versions of map data to create the fused map data, wherein the fused map data is based on more than one unique source of data and includes a greater precision and accuracy when compared to the original versions of map data alone.

2. The system of claim 1, wherein the discrete random curve is one of the following: a polyline and a Markovian random curve.

3. The system of claim 1, wherein the spatial Kalman filter cost function is expressed as:

$$\hat{l}_{1:k} = \min_{\hat{l}_{1:k}} \sum\nolimits_{i=1}^{k}(d_i - \mu_v)^T \sum\nolimits_v^{-1}(d_i - \mu_v) + \frac{|\phi_i - \phi_{i-1}|^2}{q_u^2}$$

wherein $\hat{l}_{1:k}$ represents an estimated position of the updated state vector $s_k$, k represents a total number of state vectors, $d_i$ represents the signed distance for the first map data point and the second map data point, $\mu_v$ represents a bias of measurement noise, $q_u$ represents a variance of additive white Gaussian noise, $$\sum\nolimits_v^{-1}$$

represents a covariance of the measurement noise, and $\phi_i$ represents the tangent angle.

4. The system of claim 3, wherein the one or more central computers execute instructions to:

receive ground truth map data;

execute one or more machine learning algorithms to determine a first bias and a first variance of the first set of map data points and a second bias and a second variance of the second set of map data points; and execute an iterative algorithm to remove outliers from the first map data point, the second map data point, and the ground truth map data.

5. The system of claim 4, wherein the covariance of the measurement noise is determined based on the ground truth map data.

6. The system of claim 4, wherein the iterative algorithm is a random sample consensus (RANSAC) voting algorithm.

7. The system of claim 6, wherein the bias of the measurement noise is determined based on the first bias of the first set of map data points and the second bias of the second set of map data points.

8. The system of claim 1, wherein the Kalman smoothing function is expressed as:

$$\hat{l}_{1:N} = \min_{\hat{l}_{1:N}} \sum\nolimits_{i=1}^{N}(d_i - \mu_v)^T \sum\nolimits_v^{-1}(d_i - \mu_v) + \frac{|\phi_i - \phi_{i-1}|^2}{q_u^2}$$

wherein $\hat{l}_{1:N}$ represents an estimated position of the updated state vector $s_k$, N denotes a total number of state vectors plus one, $d_i$ represents the signed distance for the first map data point and the second map data point, $\mu_v$ represents a bias of measurement noise, $q_u$ represents a variance of additive white Gaussian noise, $$\sum\nolimits_v^{-1}$$

represents a covariance of the measurement noise, and $\phi_i$ represents the tangent angle.

9. The system of claim 1, wherein the two or more versions of map data are each based on one or more of the following: global positioning system (GPS) data, perception data, a high-speed vehicle telemetry (HSVT) source, satellite image data, and data collected from survey vehicles.

10. A method for fusing two or more versions of map data together, the method comprising:

receiving, by one or more central computers, road network data representing a road network for a predefined geofenced area, a first set of map data points, and a second set of map data points, wherein the road network data includes a discrete random curve that represents lane markings, and wherein the discrete random curve includes a plurality of state vectors that are each defined by a respective location and tangent angle;

determining, by the one or more central computers, a signed distance, wherein the signed distance includes a first perpendicular distance measured from a respective first map data point to the discrete random curve and a second perpendicular distance measured from a respective second map data point to the discrete random curve;

estimating, by the one or more central computers, a position for the state vectors of the discrete random curve based on the signed distance and the tangent angle by minimizing a spatial Kalman filter cost function;

executing a Kalman smoothening function to estimate the position and the tangent angle for the state vectors that are part of the discrete random curve, wherein the state vectors each represent a map point of a fused map data;

detecting, by the one or more central computer, a data point representing a new state vector that is introduced to the discrete random curve;

in response to detecting the data point, estimating an updated state vector, where the updated state vector indicates respective values for a position and the tangent angle of a new data point, wherein the updated state vector is expressed as:

$$\hat{s}_k = \mathrm{argmin}_{s_k}(d_k - [\![\mu_v]\!])^T \sum v^{-1}(d_k - \mu_v) + s_k \widetilde{-(s_k)}^T \widetilde{P_v^{-1}} s_k \widetilde{-(s_k)}$$

wherein $\hat{s}_k$ represents the updated state vector, k represents a total number of state vectors, $\widetilde{s_k}$ represents a predicted state, $d_k$ represents a matrix indicating a lateral distance and a longitudinal distance for the first map data point and a lateral distance and a longitudinal distance for the second map data point, $\mu_v$ represents a bias of measurement noise, $$\sum_v^{-1}$$

represents a covariance of the measurement noise, and $\widetilde{P_k^{-1}}$ represents a covariance matrix; and fusing together the two or more versions of map data to create the fused map data, wherein the fused map data is based on more than one unique source of data and includes a greater precision and accuracy when compared to the original versions of map data alone.

11. A system for fusing two or more versions of map data together to create fused map data, the system comprising:

one or more central computers storing the two or more versions of map data and ground truth map data, wherein each version of the map data represents a predefined geofenced area, the one or more central computers executing instructions to:

receive road network data representing a road network for the predefined geofenced area, a first set of map data points, and a second set of map data points, wherein the road network data includes a discrete random curve that represents lane markings, and wherein the discrete random curve includes a plurality of state vectors that are each defined by a respective location and tangent angle;

determine a signed distance, wherein the signed distance includes a first perpendicular distance measured from a respective first map data point to the discrete random curve and a second perpendicular distance measured from a respective second map data point to the discrete random curve;

estimate a position for the state vectors of the discrete random curve based on the signed distance and the tangent angle by minimizing a spatial Kalman filter cost function, wherein the spatial Kalman filter cost function is expressed as:

$$\hat{l}_{1:k} = \min_{\hat{l}_{1:k}} \sum_{i=1}^{k}(d_i - \mu_v)^T \sum_v^{-1}(d_i - \mu_v) + \frac{|\phi_i - \phi_{i-1}|^2}{q_u^2}$$

wherein $\hat{l}_{1:k}$ represents an estimated position of an updated state vector $s_k$, k represents a total number of state vectors, $d_i$ represents the signed distance for the first map data point and the second map data point, $\mu_v$ represents a bias of measurement noise, $q_u$ represents a variance of additive white Gaussian noise, $$\sum_v^{-1}$$

represents a covariance of the measurement noise, and $\phi_i$ represents the tangent angle;

execute a Kalman smoothening function to estimate the position and the tangent angle for the state vectors that are part of the discrete random curve, wherein the state vectors each represent a map point of the fused map data; and fuse together the two or more versions of map data to create the fused map data, wherein the fused map data is based on more than one unique source of data and includes a greater precision and accuracy when compared to the original versions of map data alone.

12. The system of claim 11, wherein the one or more central computers execute instructions to:

receive ground truth map data;

execute one or more machine learning algorithms to determine a first bias and a first variance of the first set of map data points and a second bias and a second variance of the second set of map data points; and execute an iterative algorithm to remove outliers from the ground truth map data.

13. The system of claim 12, wherein the covariance of the measurement noise is determined based on the ground truth map data.

14. The system of claim 12, wherein the iterative algorithm is a random sample consensus (RANSAC) voting algorithm.

15. The system of claim 11, wherein the one or more central computers execute instructions to:

detect a data point representing a new state vector that is introduced to the discrete random curve; and in response to detecting the data point, estimate an updated state vector, where the updated state vector indicates respective values for a position and the tangent angle of a new data point.

16. The system of claim 11, wherein the updated state vector is expressed as:

$$\hat{s}_k = \mathrm{argmin}_{s_k}(d_k - [\![\mu_v]\!])^T \sum v^{-1}(d_k - \mu_v) + {}_{s_k} \widetilde{-(s_k)}^T \widetilde{P_k^{-1}} {}_{s_k} \widetilde{-(s_k)}$$

wherein $\hat{s}_k$ represents the updated state vector, $\widetilde{s_k}$ represents a predicted state, $d_k$ represents a matrix indicating a lateral distance and a longitudinal distance for the first map data point and a lateral distance and a longitudinal distance for the second map data point, and $\widetilde{P_k^{-1}}$ represents a covariance matrix.

17. The system of claim 11, wherein the Kalman smoothing function is expressed as:

$$\hat{l}_{1:N} = \min_{\hat{l}_{1:N}} \sum_{i=1}^{N}(d_i - \mu_v)^T \sum_v^{-1}(d_i - \mu_v) + \frac{|\phi_i - \phi_{i-1}|^2}{q_u^2}$$

wherein $\hat{l}_{1:N}$ represents an estimated position of the updated state vector $s_k$ and N denotes the total number of state vectors plus one.

\* \* \* \* \*